US007014517B2

(12) United States Patent
Suzuki

(10) Patent No.: US 7,014,517 B2
(45) Date of Patent: Mar. 21, 2006

(54) ENGINE CONTROL APPARATUS

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 46 days.

(21) Appl. No.: 10/795,961

(22) Filed: Mar. 9, 2004

(65) Prior Publication Data

US 2005/0026517 A1 Feb. 3, 2005

(30) Foreign Application Priority Data

Mar. 11, 2003 (JP) .......................... P.2003-064604

(51) Int. Cl.
*B63H 21/22* (2006.01)

(52) U.S. Cl. .......................................................... 440/1

(58) Field of Classification Search .................... 440/1, 440/2, 84–87
See application file for complete search history.

(56) References Cited

U.S. PATENT DOCUMENTS 5,347,263 A * 9/1994 Carroll et al. ............ 340/5.61
6,352,045 B1 3/2002 Takashima

FOREIGN PATENT DOCUMENTS

JP 2001-088789 A 4/2001
JP 2001-146148 A 5/2001

* cited by examiner

*Primary Examiner*—Ed Swinehart
(74) *Attorney, Agent, or Firm*—Sughrue Mion, PLLC

(57) ABSTRACT

An engine control apparatus includes: the switch case 1; the stop switch body 6; the stop switch knob 3; the lock plate 5; the transponder 9; and the control section 11 for controlling the engine operation of the small motorboat based on the ID code from the transponder. The engine stop apparatus is comprised such that, when the lock plate 5 is disengaged from the stop switch knob 3, the stop switch body 6 is activated to allow the engine to stop or to be in an idling state. In the control section 11, the antenna 12 that can receive the ID code transmitted from the transponder 9 is integrally formed with the communication circuit or the authentication circuit 14 for the ID code and these are provided in the switch case 1.

3 Claims, 4 Drawing Sheets

ENGINE CONTROL APPARATUS

BACKGROUND OF THE INVENTION

The present invention relates to an engine control apparatus comprised such that, when a lock plate is disengaged from a stop switch knob, the stop switch is turned on to allow an engine of a small motorboat or the like to stop or to be in an idling state.

A small motorboat is made to glide over water while taking a sharp turn or jumping so that an operator can enjoy a ride. This frequently causes the operator to fall into water. Due to this reason, it is required to, when the operator falls into water, stop the engine to prevent only the small motorboat from further progressing. Thus, a small motorboat is generally provided with a stop switch for allowing, when the operator falls into water, the engine to stop or to be in an idling state.

Specifically, a handle bar of the small motorboat is fixed with a switch case. The switch case has at a stop switch knob for activating a stop switch of an insertable resin-made lock plate that has at the base end a tightened wire. The tip end of the wire is fixed to the wrist or the like of the operator so that, when the operator falls into water, the lock plate is disengaged from the stop switch knob to turn on the stop switch, thereby allowing the engine of the small motorboat to stop or to be in an idling state.

As described above, the lock plate is inserted to the stop switch knob to allow the engine to start. This causes a situation where, when another lock plate of a small motorboat or a plate member having a similar shape is inserted, a third party can start the engine without the owner's permission. In order to prevent such a situation where a boat is stolen, a conventional technique (as disclosed in Patent reference 1, for example) has suggested that a small motorboat having a control section in which a transponder incorporating an ID code is embedded in a lock plate and inside the switch case an antenna that can receive the ID code so that the engine is controlled based on the received information.

The above conventional engine control apparatus is comprised such that the ID code of the transponder is transmitted via radio transmission to the antenna and the received information is transmitted to the control section so that the engine is started only when a previously registered regular ID code and the received ID code coincide. When the former is different from the latter, the engine is not started. This can start the small motorboat only when the regular lock plate is inserted to the stop switch knob and thus can prevent the boat from being stolen.

[Patent Reference 1]

Japanese Published Unexamined Patent Application No. 2001-88789

However, although the above conventional engine control apparatus allows the switch case to provide the antenna for receiving the ID code transmitted from the transponder, the control section for communication or authentication of the ID code is provided at another position (e.g., in the vicinity of ECU of the small motor boat), thus causing the problem as described below. Specifically, the above conventional technique required the antenna and the control section to be electrically connected via a code or the like, thus causing a problem in which the wiring layout is complicated and the code tends to be disconnected, causing a reduced reliability in the apparatus.

SUMMARY OF THE INVENTION

The present invention is made in view of the above. It is an object of the present invention to provide an engine control apparatus that allows the wiring layout of the control section for receiving an ID code to control the engine operation to be provided in a simpler manner and that prevents disconnection to provide an improved reliability.

The present invention according to Aspect 1 is: an engine control apparatus, comprising: a switch case fixed to a handle bar; a stop switch body that is formed in the switch case and that allows an engine to stop or to be in an idling state; a stop switch knob that is formed in the switch case and that abuts with the stop switch body to activate the stop switch body to allow the engine to stop or to be in an idling state; a lock plate insertable to the stop switch knob; a transponder that is provided at the lock plate side and that can transmit a predetermined ID code; and a control section that can receive the ID code transmitted from the transponder and that controls the engine operation based on the ID code; wherein the engine control apparatus is characterized in that: the engine control apparatus is comprised such that, when the lock plate is disengaged from the stop switch knob, the stop switch body is activated to allow the engine to stop or to be in an idling state; and in the control section, the antenna that can receive the ID code transmitted from the transponder is integrally provided with the communication circuit for the ID code and the antenna and the communication circuit are provided in the switch case.

According to the present invention of Aspect 2, the engine control apparatus according to Aspect 1 is characterized in that the authentication circuit is formed at a substrate provided in the switch case and the substrate provides the antenna and a penetrated hole to which the stop switch knob can be inserted.

According to the present invention of Aspect 3, the engine control apparatus according to Aspect 1 or Aspect 2 is characterized in that, in the control section, an authentication circuit for the ID code from the transponder is integrally provided.

DETAILED DESCRIPTION OF THE PREFERRED EMBODIMENTS

Hereinafter, embodiments of the present invention will be specifically described with reference to the drawings.

Figure 1:
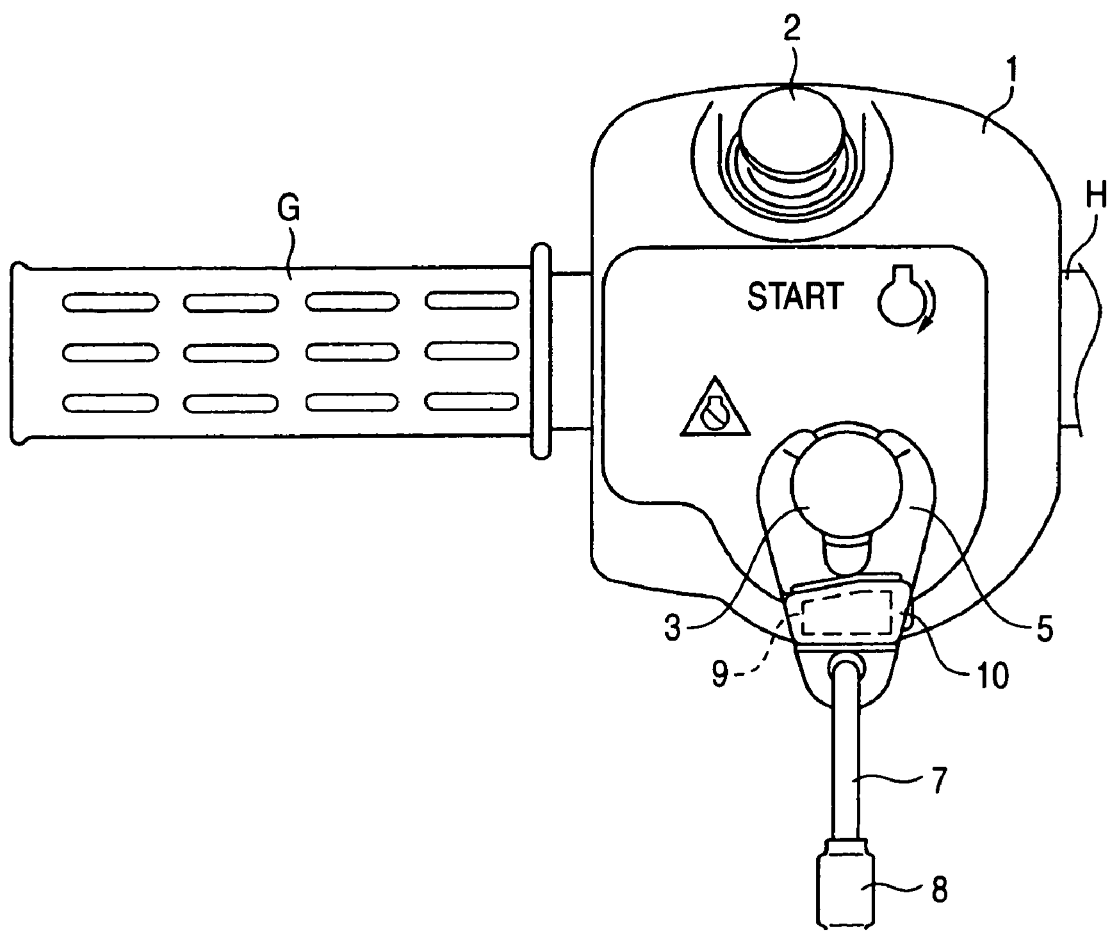
FIG. 1 is a top view illustrating the engine control apparatus for the small motorboat according to an embodiment of the present invention.
Figure 2:
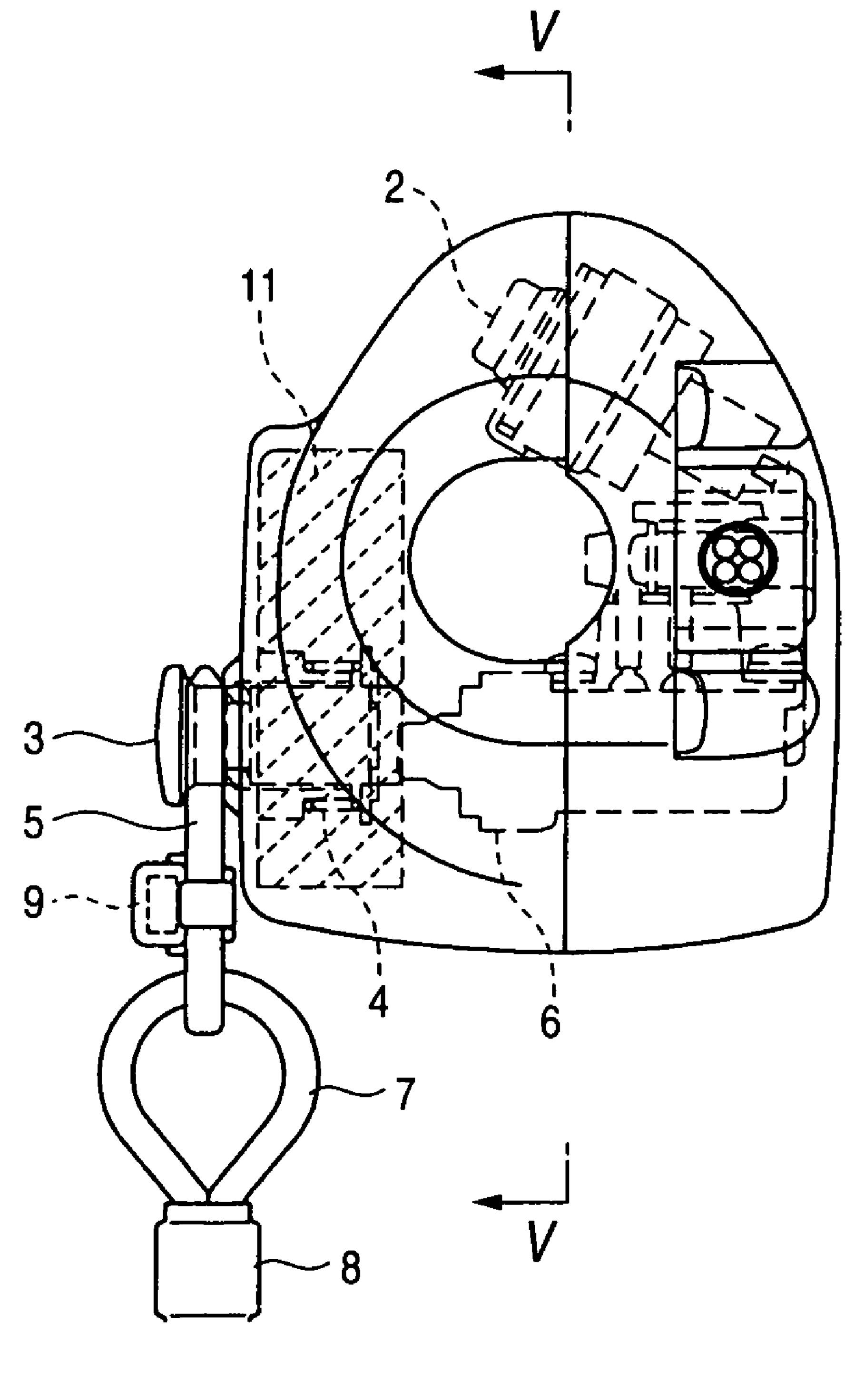
FIG. 2 is a right side view of FIG. 1.

As shown in FIG. 1 and FIG. 2, the engine control apparatus for the small motorboat according to this embodiment is provided in the resin-made switch case 1 fixed to the handle bar H of the small motorboat. The switch case 1 provides the start switch knob 2, the stop switch knob 3, the stop switch body 6, and the control section 11. The reference numeral G in FIG. 1 denotes a grip that is grasped by an operator when the operator drives the boat.

The start switch knob 2 is used to start the engine of the small motorboat. The knob is comprised such that, when the knob is pushed, then predetermined electrical conduction may be obtained to start the engine. The start switch knob 2 can be provided to the switch case 1 with an arbitrary position and inclination angle.

As shown in FIG. 2, the stop switch knob 3 is always biased by the spring 4 toward the direction adjacent to the surface of the switch case 1 (right direction in the same drawing). When the lock plate 5 (which will be described later) is inserted between the surface of the switch case 1 and the projection of the stop switch knob 3 (as shown in the same drawing), then the base end of the stop switch knob 3 (right tip end in the same drawing) is separated from the stop switch body 6.

The stop switch body 6 is provided in the switch case 1 and is activated when abutting with the base end of the stop switch knob 3 to allow the engine of the small motorboat to stop. This allows, when the lock plate 5 is disengaged from the stop switch knob 3, the stop switch body 6 to activate to allow the engine of the small motorboat to be forcedly stopped.

Figure 3:
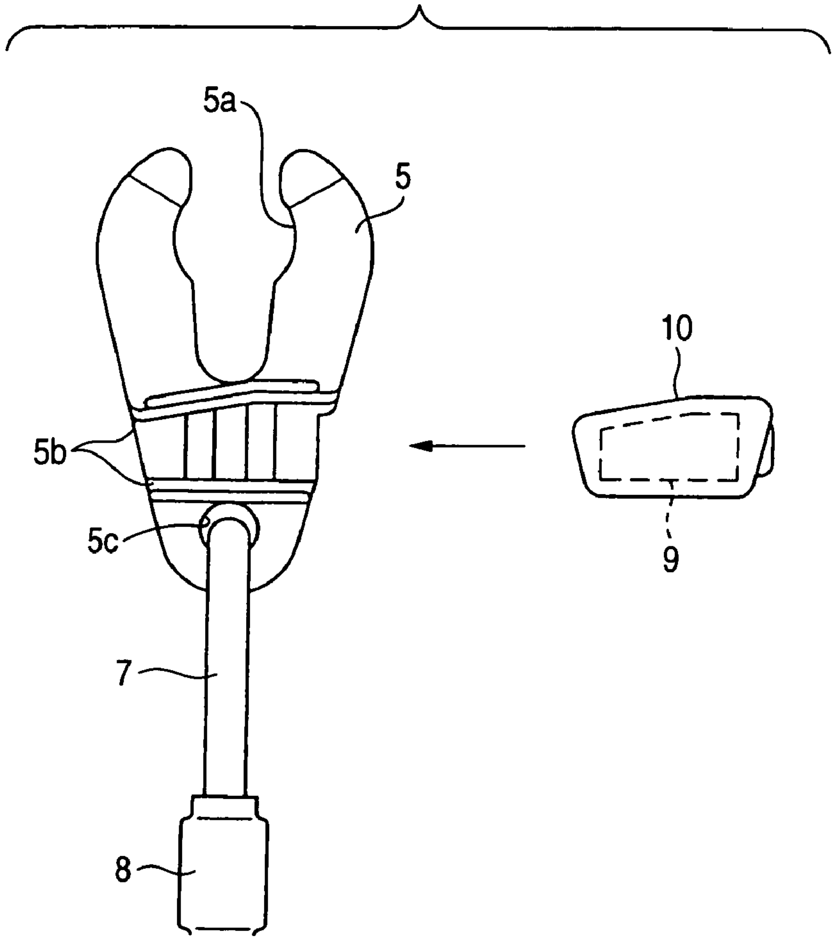
FIG. 3 is a top view illustrating the lock plate and the attachment of the engine control apparatus for the small motorboat according to the embodiment of the present invention.

The lock plate 5 includes a resin-made plate-like member and forms, as shown in FIG. 3, the notch 5*a* at one end in the plan view. The lock plate 5 also has at the substantial center two convex sections 5*b* and has at the other end of the plan view a hole 5*c* to which the wire 7 is inserted. The tip end of the wire 7 (not shown) is designed to be attached to the wrist or the like of an operator of the small motorboat.

When the notch 5*a* is engaged with or separated from the periphery side of the stop switch knob 3, the lock plate 5 can be inserted to the stop switch knob 3. This allows, when the operator falls into water, the lock plate 5 to be disengaged from the stop switch knob 3 via the wire 7. In the drawing, the reference numeral 8 denotes a circular ring-shaped metal fitting for inserting the tip end of the wire 7 to the hole 5*c*.

Figure 4:
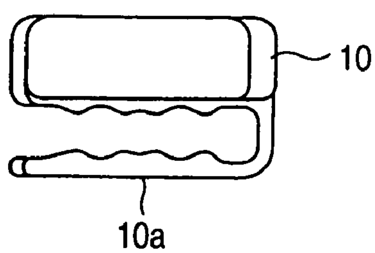
FIG. 4 is a front view illustrating the attachment.

The two convex sections 5*b* formed at the lock plate 5 have a groove-like shape over the surface of the lock plate 5 to which the resin-made attachment 10 incorporating the transponder 9 can be attached. Specifically, this attachment 10 has at the lower face the clip section 10*a* as shown in FIG. 4. The attachment 10 is comprised such that, when the clip section 10*a* sandwiches the top and back face of the lock plate 5 (more specifically, the space between the two convex sections 5*b*), the attachment 10 can be attached.

The transponder 9 is provided at the lock plate 5 side to hold a predetermined ID code and can transmit the ID code from an antenna (not shown) via radio transmission. The ID code includes information for providing an arbitrary engine performance. The engine performance includes, for example, the engine performance for a beginner or one for an experienced user. In this embodiment, the engine is first allowed to be in an idling state when the lock plate 5 is engaged with the stop switch knob 3 to subsequently activate the start switch knob 2.

The control section 11 is provided in the vicinity of the stop switch body 6 in the switch case 1 and can receive an ID code transmitted from the transponder 9 and control, based on the ID code, the engine operation of the small motorboat. Specifically, as shown in FIG. 5, the control section 11 includes the antenna 12 on one substrate 13 on which the communication circuit and authentication circuit 14 are formed and is fixed to the interior of the switch case 1.

The antenna 12 can receive an ID code transmitted from the transponder 9 and has a coil-like shape. The antenna 12 is formed on the surface of the substrate 13 (left side in FIG. 2) and is electrically connected to the communication circuit and authentication circuit 14 in the substrate 13. Specifically, in the control section 11, the antenna 12 and the communication circuit and authentication circuit 14 are integrally formed and are provided in the switch case 1. This allows the wiring layout to be simpler and prevents disconnection as compared to the case of the conventional antenna control section, thus improving the reliability of the engine control apparatus itself.

The switch case 1 also normally includes the seal means for preventing water from flooding the interior. This prevents, even when the provision of the control section 11 in the switch case 1 causes the small motorboat to fall or to become submerged under a sea wave, the substrate 13 in the control section 11 from flooding, thus preventing an electrical defect. If a part in which the control section 11 is provided in the switch case 1 is filled with a predetermined resin for resin molding, the waterproofing effect can be further improved.

Figure 5:
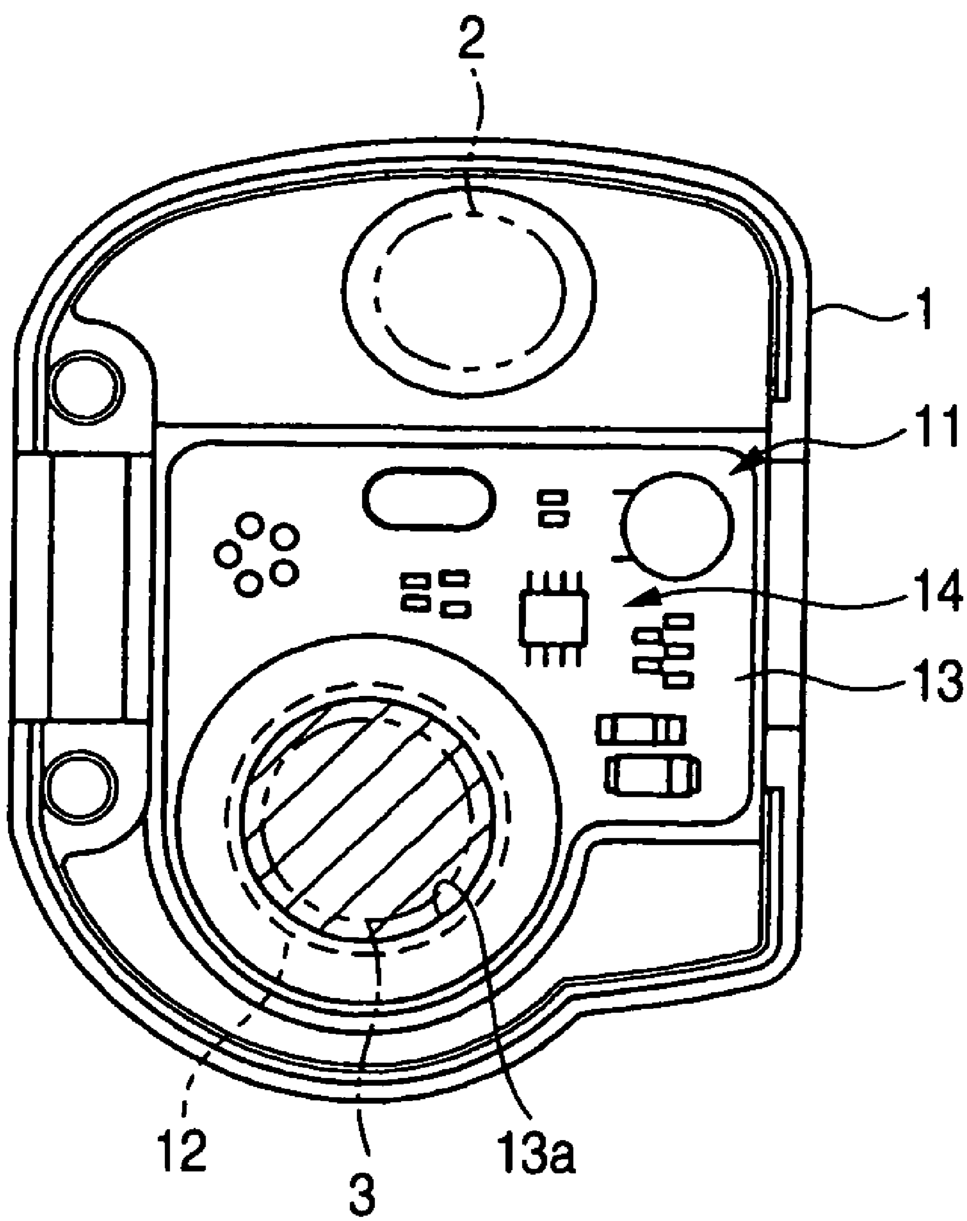
FIG. 5 is a diagram taken at the line V—V in FIG. 2.

Furthermore, the substrate 13 in the control section 11 includes the penetrated hole 13*a* as shown in FIG. 5 to which the stop switch knob 3 can be inserted. This kind of structure can provide an effective use of space in the switch case 1, thus providing the switch case 1 with a smaller shape. The penetrated hole 13*a* has at the periphery the coil-like antenna 12 so that the stop switch knob 3 inserted to the penetrated hole 13*a* does not interfere with the antenna 12.

Moreover, the authentication circuit 14 formed in the substrate 13 changes the engine performance based on the ID code received by the antenna 12 and the transponder 9 is detachably attached to the lock plate 5. This allows an operator to easily exchange the transponder 9 according to need. Specifically, the engine performance can be easily changed in an arbitrary manner depending on the operator's preference.

The embodiment is described as in the above, however, the present invention is not limited to this. For example, the transponder and the lock plate also may be integrally provided (e.g., the transponder 9 may be inserted to the lock plate 5). Although this embodiment allows the substrate 13 to have the penetrated hole 13*a* to which the stop switch knob 3 is inserted, the substrate 13 also may have no penetrated hole 13*a* so that the stop switch knob 3 is provided at a position other than the one in the substrate 13. The substrate 13 also may form only the communication circuit so that the authentication circuit is formed at another part in the small motorboat.

According to the present invention of Aspect 1 or Aspect 3, in the control section, the antenna that can receive the ID code transmitted from the transponder is integrally formed with the communication circuit or the authentication circuit for the ID code and they are provided in the switch case. This allows the control section in the engine control apparatus to have a simpler wiring layout and prevents disconnection, thus improving the reliability of the apparatus.

According to the present invention of Aspect 2, the substrate forming the authentication circuit has the penetrated hole to which the stop switch knob is inserted. This can provide an effective use of space in the switch case, thus providing the switch case with a smaller shape.

What is claimed is:

1. An engine control apparatus comprising:

a switch case fixed to a handle bar;

a stop switch body that is formed in the switch case and that allows an engine to stop or to be in an idling state;

a stop switch knob that is formed in the switch case and that abuts with the stop switch body to activate the stop switch body to allow the engine to stop or to be in an idling state;

a lock plate insertable to the stop switch knob;

a transponder that is provided at the lock plate that transmits a predetermined ID code; and a control section that receives the ID code transmitted from the transponder and that controls the engine operation based on the ID code, wherein the control section comprises an antenna that receives the ID code that is transmitted from the transponder and a communication circuit that processes the ID code which is received by the antenna, said antenna and said communication circuit being provided on a common substrate within the switch case, and wherein the stop switch body is activated to allow the engine to stop or to be in an idling state if the lock plate is disengaged from the stop switch knob.

2. The engine control apparatus according to claim 1, further comprising:

an authentication circuit formed on the common substrate provided within the switch case, wherein the common substrate forms the antenna and a penetrated hole through which the stop switch knob is inserted.

3. The engine control apparatus according to claim 1, further comprising:

an authentication circuit integrally formed on the common substrate, said authentication circuit operable to authenticate the ID code from the transponder.

* * * * *